(12) United States Patent
Kim

(10) Patent No.: US 11,454,842 B2
(45) Date of Patent: Sep. 27, 2022

(54) DISPLAY DEVICE

(71) Applicant: Samsung Display Co., Ltd., Yongin-si (KR)

(72) Inventor: Yong Seok Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/232,119

(22) Filed: Apr. 15, 2021

(65) Prior Publication Data

US 2022/0043300 A1  Feb. 10, 2022

(30) Foreign Application Priority Data

Aug. 4, 2020  (KR) ........................ 10-2020-0097272

(51) Int. Cl.
*G02F 1/1335* (2006.01)
*G02F 1/13363* (2006.01)
*G02F 1/1337* (2006.01)
*G02F 1/137* (2006.01)

(52) U.S. Cl.
CPC ........ *G02F 1/133531* (2021.01); *G02F 1/137* (2013.01); *G02F 1/133565* (2021.01); *G02F 1/133636* (2013.01); *G02F 1/133638* (2021.01); *G02F 1/133742* (2021.01); *G02F 2413/01* (2013.01); *G02F 2413/07* (2013.01); *G02F 2413/15* (2013.01)

(58) Field of Classification Search
CPC ......... G02F 1/133531; G02F 1/133742; G02F 1/133638; G02F 1/133636; G02F 1/137; G02F 2413/01; G02F 2413/07; G02F 2413/015
See application file for complete search history.

(56) References Cited

U.S. PATENT DOCUMENTS

| | | | |
|---|---|---|---|
| 7,609,339 B2 | 10/2009 | Choi | |
| 8,913,216 B2 | 12/2014 | Choe et al. | |
| 2012/0257147 A1* | 10/2012 | Shibata | ................ G02B 5/3083 349/96 |
| 2019/0353943 A1 | 11/2019 | Smith et al. | |
| 2020/0159066 A1* | 5/2020 | Kawahira | ......... G02F 1/133528 |
| 2021/0050393 A1* | 2/2021 | Smith | ................. H01L 27/3232 |
| 2021/0373371 A1* | 12/2021 | Li | ..................... G02F 1/134309 |

FOREIGN PATENT DOCUMENTS

| KR | 20090130760 | 12/2009 |
|---|---|---|
| KR | 101268954 | 5/2013 |
| KR | 20200023864 | 3/2020 |

* cited by examiner

*Primary Examiner* — Nathanael R Briggs
(74) *Attorney, Agent, or Firm* — H.C. Park & Associates, PLC

(57) ABSTRACT

A display device includes a display module that includes a plurality of light emitting areas and a non-light emitting area that surrounds the light emitting areas, a first polarizer disposed on the display module, a second polarizer disposed on the first polarizer, and a liquid crystal layer disposed between the first polarizer and the second polarizer. A plurality of openings are defined in the first polarizer or the second polarizer, and the openings overlap the light emitting areas. The display device is switchable between public and private viewing modes via an external input, in which a viewing angle of the display device in the private viewing mode is narrower than in the public viewing mode.

20 Claims, 14 Drawing Sheets

DISPLAY DEVICE

CROSS-REFERENCE TO RELATED APPLICATION

This application claims priority from and the benefit of Korean Patent Application No 10-2020-0097272, filed on Aug. 4, 2020, which is hereby incorporated by reference for all purposes as if fully set forth herein.

BACKGROUND

Field

Embodiments of the invention relate generally to a display device, and more particularly, to a display device switchable between a private viewing mode and a public viewing mode.

Discussion of the Background

Display devices, which are included in various electronic apparatuses used in multimedia apparatuses such as televisions, mobile phones, tablet computers, laptop computers, and game consoles, are currently being developed. Specifically, such a display device may be a liquid crystal display device (LCD), an organic lighting emitting diode display device (OLED), a micro lighting emitting diode display device (μLED), or the like.

Users prefer not only a display device providing a wide viewing angle for ease in viewing, but also a display device providing a narrow viewing angle at certain times so as to prevent other people from watching the display device when performing tasks requiring privacy protection or security.

The above information disclosed in this Background section is only for understanding of the background of the inventive concepts, and, therefore, it may contain information that does not constitute prior art.

SUMMARY

Applicant realized that there is a need for a display device that has both a private viewing mode having narrow viewing angle characteristics to protect privacy and a public viewing mode having wide viewing angle characteristics to enable many people to watch a screen together.

Display devices constructed according to the principles and illustrative implementations of the invention provide both a wide angle view in a public viewing mode, and a narrow angle view in a private viewing mode. Thus, an optical viewing angle over which an image is displayed on a display surface of the display device is limited in the private viewing mode, and a user may protect privacy or security information when in the private viewing mode. For example, the display device may include a plurality of polarizers having polarization directions perpendicular to each other and a liquid crystal layer disposed between the plurality of polarizers, and thus, the display device is switchable between the public viewing mode and the private viewing mode. A plurality of openings overlapping the plurality of light emitting areas may be defined in one of the plurality of polarizers, and thus, the optical efficiency of the front light beams of the display device may be improved in the public viewing mode and the private viewing mode.

Display devices constructed according to the principles and embodiments of the invention also may reduce the reflection of external light in the private viewing mode by using the plurality of polarizers that have polarization directions perpendicular to each other, and may further include a phase difference layer below the plurality of polarizers to reduce the reflection of external light even in the public viewing mode.

Accordingly, display devices constructed according to the principles and illustrative implementations of the invention provide have improved optical efficiency and are switchable between private and public viewing view modes.

Additional features of the inventive concepts will be set forth in the description which follows, and in part will be apparent from the description, or may be learned by practice of the inventive concepts.

According to one aspect of the invention, a display device includes: a display module which includes a plurality of light emitting areas and a non-light emitting area that surrounds the light emitting areas; a first polarizer disposed on the display module; a second polarizer disposed on the first polarizer; and a liquid crystal layer disposed between the first polarizer and the polarizer, wherein a plurality of openings are defined in the first polarizer or the second polarizer, and the openings overlap the light emitting areas.

A polarization direction of the first polarizer and a polarization direction of the second polarizer may be perpendicular (i.e., orthogonal) to each other.

The display device may further include at least one transparent substrate disposed on the display module, wherein at least one of the first polarizer and the second polarizer includes a polymer and is spaced apart from the liquid crystal layer with the transparent substrate therebetween.

At least one of the first polarizer and the second polarizer may include a metal and may be in contact with the liquid crystal layer.

The openings may be defined in the first polarizer, and the second polarizer may cover the light emitting areas and the non-light emitting area.

The openings may be defined in the second polarizer, and the first polarizer may cover the light emitting areas and the non-light emitting area.

The display device may further include a λ/4 phase difference layer disposed between the display module and the first polarizer.

Each of the openings may correspond to a respective one of the light emitting areas.

Each of the light emitting areas may be a light emitting area configured to emit first color light, second color light, or third color light.

For at least some of the openings, one opening may overlap a plurality of light emitting areas.

The plurality of light emitting areas overlapping the one opening may emit the substantially the same color light.

The plurality of light emitting areas overlapping the one opening may emit light of different colors.

The liquid crystal layer may be one of a vertical alignment liquid crystal layer and a nematic liquid crystal layer.

The display device may be switchable in response to an external input to change the orientation of the molecules in the liquid crystal layer to switch the display from a private viewing mode in which light passes through only one of the first and second polarizers, and a public viewing mode in which light passes through both of the first and second polarizers.

The display module may include an organic light emitting display panel, a quantum dot display panel, a micro LED display panel, or a liquid crystal display panel.

According to another aspect of the invention, a display device includes: a display module which includes a plurality of light emitting areas and a non-light emitting area that surrounds the light emitting areas; a phase difference layer disposed on the display module; a liquid crystal layer disposed on the phase difference layer; an in-cell polarizer which is disposed between the phase difference layer and the liquid crystal layer and is in contact with the liquid crystal layer; and a polarizer disposed on the liquid crystal layer, wherein a plurality of openings are defined in the in-cell polarizer, and each of the openings overlaps a respective one of the light emitting areas.

A polarization direction of the in-cell polarizer and a polarization direction of the polarizer may be perpendicular (i.e., orthogonal) to each other.

The in-cell polarizer may comprise a wire grid polarizing layer and the polarizer disposed on the liquid crystal layer includes a polarizing layer.

Each of the openings may have a shape that corresponds to a shape of the respective one of the plurality of light emitting areas.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIGS. 3A to 7 illustrate cross-sectional views corresponding to those taken along line I-I' of FIG. 2. More specifically:

FIGS. 3A and 3B are cross-sectional views of the display device DA of FIG. 1 in a public mode and a private mode, respectively.

FIG. 4 is a cross-sectional view of the display device of FIG. 1 illustrating a different embodiment of a liquid crystal layer LQ from the type of liquid crystal layer illustrated in FIG. 3A.

FIGS. 5 to 7 illustrate various embodiments of first and second polarizing layers.

DETAILED DESCRIPTION

Figure 1:
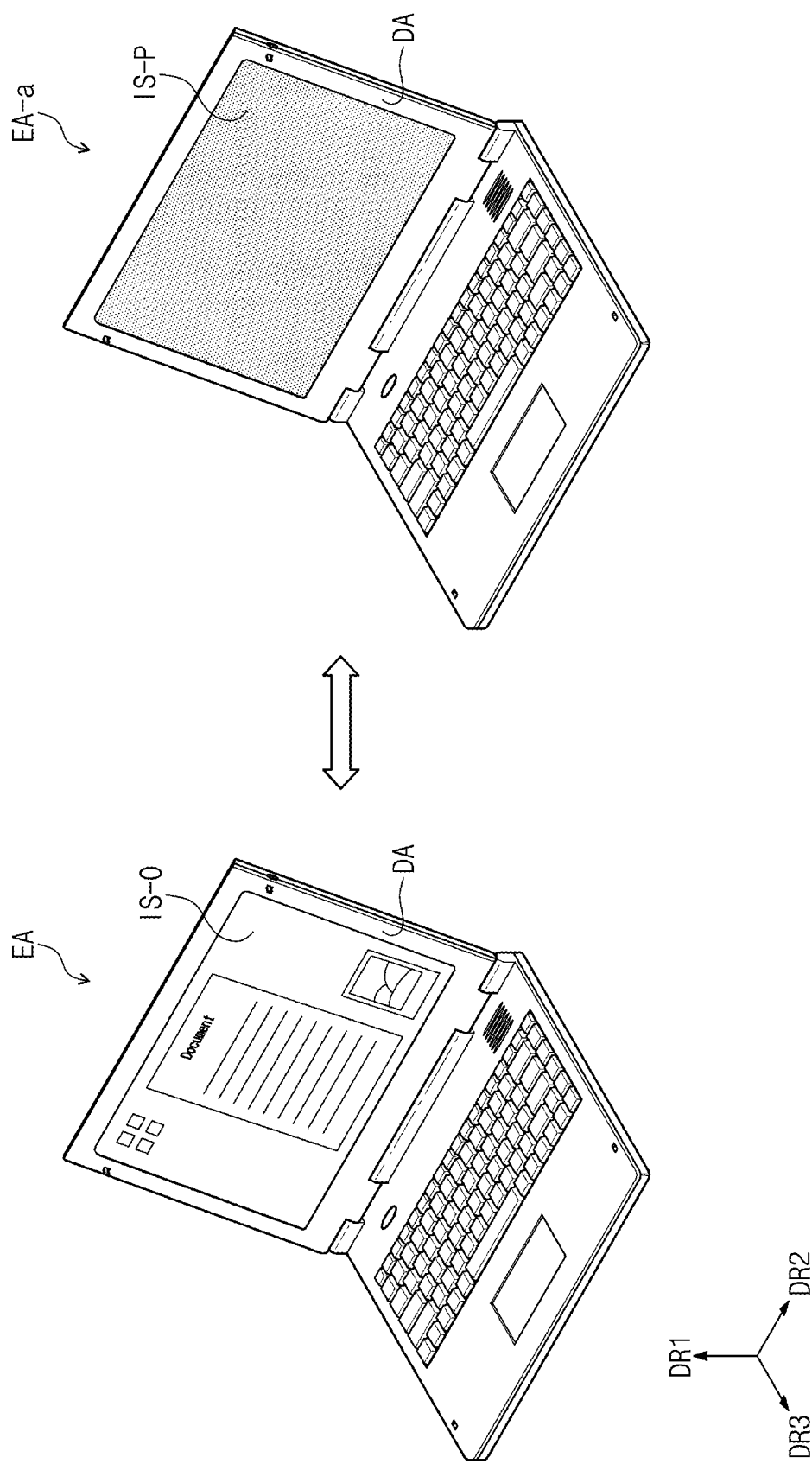
FIG. 1 is a perspective view illustrating one example of an electronic apparatus constructed according to principles of the invention that is switchable between a public mode and a private mode.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view illustrating one example of an electronic apparatus constructed according to principles of the invention that is switchable between a public viewing mode (hereinafter 'public mode') and a private viewing mode (hereinafter 'private mode'). An electronic apparatus EA in the public mode is illustrated on the left drawing, and an electronic apparatus EA-a in the private mode is illustrated on the right drawing. FIG. 1 illustrates laptop computers as one example of the electronic apparatuses EA and EA-a.

A display device DA may be applied to the electronic apparatus EA. In addition to the laptop computers illustrated as the one example, the display device DA may be applied to a mobile phone, a tablet computer, a wrist watch-type electronic apparatus, a game console, a personal computer, or the like.

Through a display surface, the display device DA may provide a user with an image. In the display device DA, an optical viewing angle, over which an image is provided to a user, may be changed depending on a viewing mode. FIG. 1 is the perspective view of the display device DA including a display surface IS-O in the public mode and a display surface IS-P in the private mode that can be switched from one to the other.

A display device DA in the public mode may have a wide optical viewing angle. In the public mode, an image output through the display surface IS-O may be viewed by a user from not only the front but also the side. Thus, the image displayed on one screen may be viewed by many people at various angles.

A display device DA in the private mode may have a narrow optical viewing angle. In the private mode, due to the narrow optical viewing angle, an image output through the display surface IS-P may be viewed by a user from the front not from the side. Thus, an optical viewing angle over which the image is displayed through the display surface IS-P may be limited, and a user using the display device DA may protect privacy or security.

As illustrated in FIG. 1, the public mode and the private mode in a display device may be switched from one mode to the other mode. For example, by reception of an external input to the display device (i.e., an input command by a user to the display device, or a particular user action such as pressing a particular key or sequence of keys on a keyboard provided on a non-display area of an apparatus that includes the display device, or by the user performing a particular swipe action or actions on the display device), the public mode may be switched to the private mode, or the private mode may be switched to the public mode. Thus, the user may apply the public mode or the private mode according to the user's needs and use the display device DA.

Figure 2:
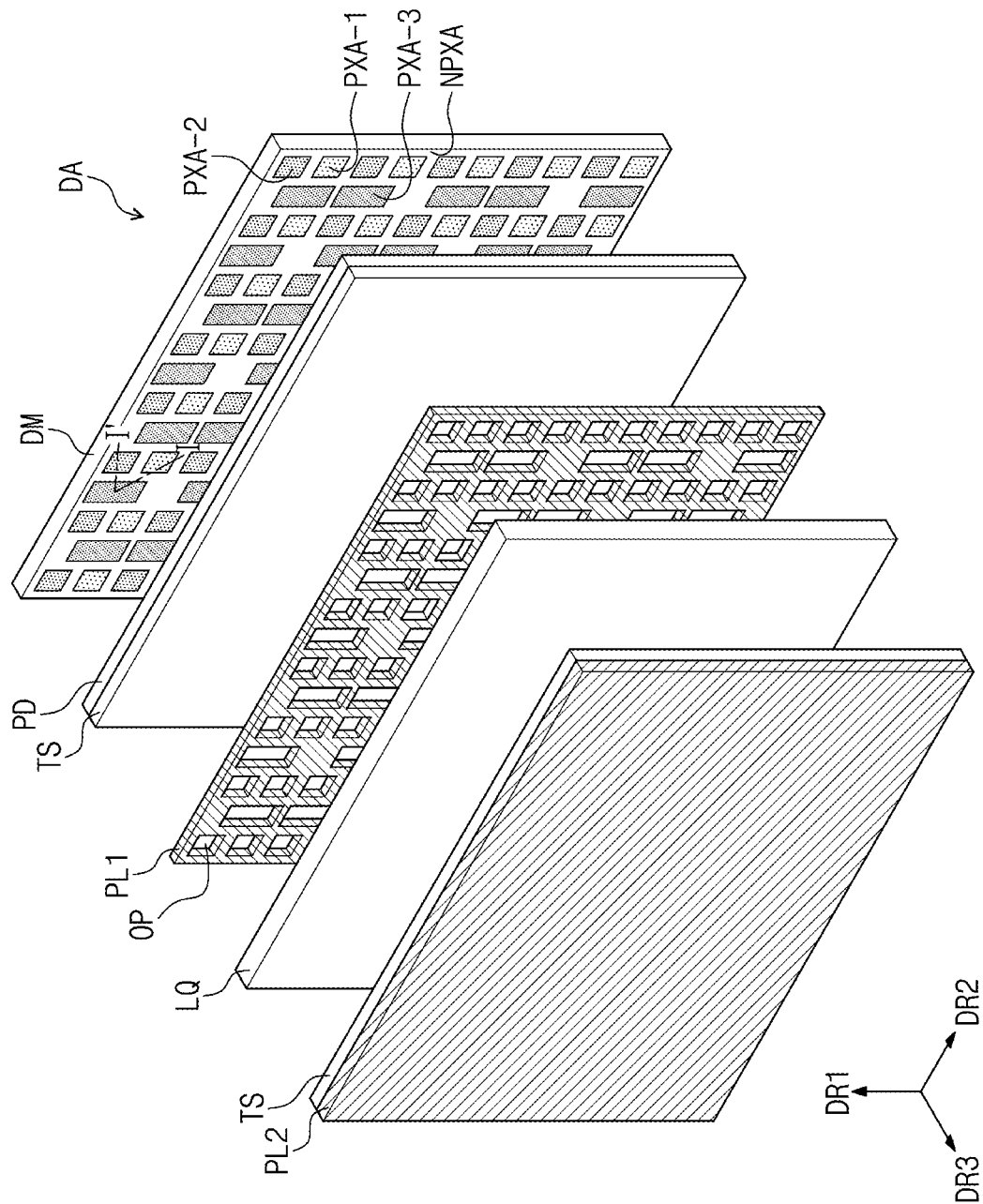
FIG. 2 is an exploded perspective view of the display device of FIG. 1.

FIG. 2 is an exploded perspective view of a display device DA. The display device DA may include a display module DM, a phase difference layer PD, a plurality of polarizing layers PL1 and PL2, a liquid crystal layer LQ, and at least one transparent substrate TS.

Here, a display surface of the display device DA may be substantially parallel to a plane defined by a direction of a first directional axis DR1 and a direction of a second directional axis DR2. The display device DA may display an image on the display surface toward a direction of a third directional axis DR3 that is orthogonal to both the first directional axis and the second directional axis (e.g., the third directional axis DR3 is in a Z direction, where the first directional axis is an X direction and the second directional axis DR2 is a Y direction in an X,Y,Z coordinate system).

A top surface (or a front surface) and a bottom surface (or a rear surface) for each member may be defined with respect to the direction in which light of the display device DA is output. The top and bottom surfaces may be opposed to each other in the direction of the third directional axis DR3, and the normal direction of each of the top and bottom surfaces may be substantially parallel to the direction of the third directional axis DR3. As used herein, the expression "when viewed in a plan view" may connote the state of being viewed in the direction of the third directional axis DR3. The direction of the third directional axis DR3 may indicate the thickness direction of the display device DA.

Here, the directions indicated as the first to third directional axes DR1, DR2, and DR3 are relative and thus may be changed to other directions. Hereinafter, first to third directions refer to the same reference symbols as the directions indicated by the first and third directional axes DR1, DR2, and DR3, respectively.

The display module DM may include a plurality of light emitting areas PXA-1, PXA-2, and PXA-3 and a non-light emitting area NPXA. The plurality of light emitting areas PXA-1, PXA-2, and PXA-3 may output light over the display module DM. The plurality of light emitting areas PXA-1, PXA-2, and PXA-3 may be repeatedly arranged on the display module DM, and the non-light emitting area NPXA may surround the plurality of light emitting areas PXA-1, PXA-2, and PXA-3.

As one embodiment, FIG. 2 illustrates a first light emitting area PXA-1, a second light emitting area PXA-2, and a third light emitting area PXA-3. Each of the first light emitting area PXA-1, the second light emitting area PXA-2, and the third light emitting area PXA-3 may be a plurality of areas arranged on the display module DM.

The plurality of light emitting areas PXA-1, PXA-2, and PXA-3 may have substantially the same surface area as each other or different surface areas from each other. One example illustrates the first light emitting area PXA-1 and the second light emitting area PXA-2 having the substantially the same surface area when viewed in a plan view and the third light emitting area PXA-3 having a surface area different from that of each of the first and second light emitting areas PXA-1 and PXA-2. However, the plurality of light emitting areas PXA-1, PXA-2, and PXA-3 are not necessarily limited to the one example illustrated in the drawing. For example, all of the plurality of light emitting areas PXA-1, PXA-2, and PXA-3 may have the substantially the same surface area when viewed in a plan view. Alternatively, some of them may have the substantially the same surface area, or each of them may have a different surface area.

The plurality of light emitting areas PXA-1, PXA-2, and PXA-3 may have various shapes when viewed in a plan view. One example illustrates the first to third light emitting areas PXA-1, PXA-2, and PXA-3 having a generally quadrilateral shape when viewed in a plan view. However, shapes of the plurality of light emitting areas PXA-1, PXA-2, and PXA-3 are limited thereto and may have a generally polygonal shape such as a triangle and a hexagon.

The plurality of light emitting areas PXA-1, PXA-2, and PXA-3 may output the substantially the same color light or various color light. For example, all of the first to third light emitting areas PXA-1, PXA-2, and PXA-3 may output a single color light. Alternatively, the first light emitting area PXA-1 may output a first color light, the second light emitting area PXA-2 may output a second color light, and the third light emitting area PXA-3 may output a third color light. The color light output from the first to third light emitting areas PXA-1, PXA-2, and PXA-3 may be red light, green light, and blue light respectively, but is the embodiments of the invention are not necessarily limited to the example described above.

In response to an electrical signal, each of the first to third light emitting areas PXA1, PXA2, and PXA3 may provide different color light. Through the first to third light emitting areas PXA1, PXA2, and PXA3, the display module DM may emit light having color information. The non-light emitting area NPXA may determine boundaries between the first to third light emitting areas PXA1, PXA2, and PXA3 and prevent color mixing between the first to third light emitting areas PXA1, PXA2, and PXA3.

Each of the plurality of light emitting areas PXA-1, PXA-2, and PXA-3 may have a size varying according to color of emitted light. The plurality of light emitting areas PXA-1, PXA-2, and PXA-3 may provide a light emitting area having an appropriate size according to the color of emitted light and may allow various colors to have the uniform optical efficiency. However, the sizes of the plurality of light emitting areas PXA-1, PXA-2, and PXA-3 are not limited thereto.

The display module DM may include a display panel that outputs an image in response to an electrical signal. For example, the display module DM may include an organic light emitting display panel, a quantum dot display panel, a micro LED display panel, a liquid crystal display panel, or the like, but the embodiments of the invention are not necessarily limited to the examples described above. Hereinafter, the display module DM including the organic light emitting display panel will be described in more detail below.

Here, the display panel may include a light emitting layer, an array substrate, etc. depending on a type thereof, and the array substrate may include a gate line, a data line, a thin film transistor connected to the gate line and the data line, a pixel electrode connected to the thin film transistor, and the like. Also, the display panel may further include a color filter layer disposed on the light emitting layer.

The first polarizer, which may be in the form of a first polarizing layer PL1 and the second polarizer, which may be in the form of a second polarizing layer PL2, may be disposed on the display module DM. The second polarizing layer PL2 may be disposed on the first polarizing layer PL1. That is, the first polarizing layer PL1 may be disposed closer to the display module DM than the second polarizing layer PL2.

The first polarizing layer PL1 and the second polarizing layer PL2 may allow light, which vibrates in a direction substantially parallel to a polarization axis having one direction, to pass therethrough. The first polarizing layer PL1 and the second polarizing layer PL2 may have polarization directions different from each other. For example, the polarization direction of the first polarizing layer PL1 and the polarization direction of the second polarizing layer PL2 may be perpendicular (i.e., orthogonal) to each other.

A plurality of openings OP may be defined in the first polarizing layer PL1 or the second polarizing layer PL2. FIG. 2 illustrates the first polarizing layer PL1 in which the plurality of openings OP are defined. However, the embodiments of the invention are not limited thereto, and the plurality of openings OP may be defined in the second polarizing layer PL2. The plurality of openings OP may overlap the plurality of light emitting areas PXA-1, PXA-2, and PXA-3 in the direction of the third directional axis DR3. The detailed description thereof will be given below.

The liquid crystal layer LQ may be disposed between the first polarizing layer PL1 and the second polarizing layer PL2. The liquid crystal layer LQ may be disposed in direct contact with at least one of the first polarizing layer PL1 or the second polarizing layer PL2. But the embodiments of the invention are not limited thereto, and the liquid crystal layer LQ may be spaced apart from at least one of the first polarizing layer PL1 or the second polarizing layer PL2 with a transparent substrate TS therebetween. For example, as illustrated in FIG. 2, the liquid crystal layer LQ may be disposed on the first polarizing layer PL1 and be in direct contact with the first polarizing layer PL1, and may be disposed below the second polarizing layer PL2 and spaced apart from the second polarizing layer PL2 with the transparent substrate TS therebetween.

The liquid crystal layer LQ may have a transition state between a liquid and a crystal and exhibit optical characteristics according to a change in voltage or temperature. An optical path may be affected by the arrangement of liquid crystal molecules included within the liquid crystal layer LQ, and accordingly, an optical viewing angle of the display device DA may change. The detailed description thereof will be given below.

The phase difference layer PD may be disposed between the display module DM and the first polarizing layer PL1. To protect the phase difference layer PD, a transparent substrate TS may be disposed between the first polarizing layer PL1 and the phase difference layer PD. The phase difference layer PD may delay a phase of light passing through the phase difference layer PD and change a phase of an optical vibration direction, and thus constitutes an optional component. Specifically, the phase difference layer PD may be a $\lambda/4$ phase difference layer PD. Here, the phase difference layer PD may be omitted.

The display device DA may include at least one transparent substrate TS disposed on the display panel DM, and thus constitutes an optional component. For example, the transparent substrate TS may be provided as a plurality of transparent substrates (e.g., in a stacked configuration), and the transparent substrates TS may be disposed on a top surface and a bottom surface of the liquid crystal layer LQ, respectively. FIG. 2 illustrates one transparent substrate TS disposed between the phase difference layer PD and the first polarizing layer PL1 and another transparent substrate TS disposed between the liquid crystal layer LQ and the second polarizing layer PL2. However, the embodiments of the invention are not limited thereto. Only one transparent substrate TS may be disposed, or the transparent substrate TS may be omitted.

The display device DA may be rigid. FIG. 2 illustrates the display device DA having a substantially flat shape, but the embodiments of the invention are not limited thereto. The display device DA may have a curved shape or a partially bent state. Also, the display device DA may be flexible. This means the characteristics of being bendable, and may encompass all structures from a completely foldable structure to a structure bendable to a several-nanometer size.

FIGS. 3A to 7 illustrate cross-sectional views corresponding to those taken along line I-I' of FIG. 2. Thus, each of FIGS. 3A to 7 illustrates a cross-sectional view corresponding to one of first to third light emitting areas PXA-1, PXA-2, and PXA-3. Each of display devices DA illustrated in FIGS. 3A to 7 includes substantially the same components, but there is a difference in some components, to be described in detail hereinbelow.

Referring to FIGS. 3A to 7, the display device DA may include a display module DM, a first polarizing layer PL1, a second polarizing layer PL2, a liquid crystal layer LQ, a phase difference layer PD, and at least one transparent substrate TS disposed on the display module DM. The arrangements or shapes of the first polarizing layer PL1 and the second polarizing layer PL2 may change, and the arrangements of liquid crystal molecules LM-W and LM-B included in the liquid crystal layer LQ may change.

The display module DM may include a first electrode EL1, a second electrode EL2, a light emitting layer EML, and a partition wall BM. The light emitting layer EML may be disposed between the first electrode EL1 and the second electrode EL2 which face each other in the direction of the third directional axis DR3.

Holes and electrons injected from the first electrode EL1 and the second electrode EL2 are recombined in the light emitting layer EML, and thus, the display module DM may generate light. The light generated in the light emitting layer EML may be colored light having a specific wavelength range. Here, light emitting functional layers such as a hole transport area and an electron transport area may be further included between the light emitting layer EML and each of the first electrode EL1 and the second electrode EL2.

The light emitting layer EML may be provided in plurality and disposed corresponding to a plurality of light emitting areas. For example, the light emitting layer EML may include a first light emitting layer EML1, a second light emitting layer EML2, and a third light emitting layer EML3, which may correspond to first to third light emitting areas PXA-1, PXA-2, and PXA-3. The first light emitting layer EML1, the second light emitting layer EML2, and the third light emitting layer EML3

The light emitting layers EML1, EML2, and EML3 may generate the substantially the same color light or different color light. For example, the first light emitting layer EML1 may generate red light, the second light emitting layer EML2 may generate green light, and the third light emitting layer EML3 may generate blue light. Thus, the red light may be output from the first light emitting area PXA-1, the green light may be output form the second light emitting area PXA-2, and the blue light may be output from the third light emitting area PXA-3. However, the embodiments of the invention are not limited to the example described above.

The light emitting element included in the light emitting layer EML may be an organic light emitting element. However, the embodiments are not limited thereto, and the light emitting element may be a nano light emitting element, a quantum dot light emitting element, a quantum rod light emitting element, or other known light emitting element. Using the light emitting element included in the light emitting layer EML, the display module DM may provide light to a user.

Here, the display module DM is not limited to the one example described above. The light emitting layer EML may be formed integrally and output a first light having the substantially the same color light or the substantially the same wavelength. The display module DM may further include a color filter layer disposed on the light emitting layer EML, and the color filter layer may allow the light, which is provided from the light emitting layer EML, to be converted into light having a different wavelength range or to pass therethrough.

The first electrode EL1 and the second electrode EL2 may include metal. The first electrode EL1 and the second electrode EL2 may be a semi-transmissive electrode or a reflective electrode. For example, each of the first electrode EL1 and the second electrode EL2 may include indium tin oxide (ITO), indium zinc oxide (IZO), zinc oxide (ZnO), indium tin zinc oxide (ITZO), Ag, Mg, Cu, Al, Pt, Pd, Au, Ni, Nd, Ir, Cr, Li, Ca, LiF/Ca, LiF/Al, Mo, Ti, or a compound or mixture thereof (for example, a mixture of Ag and Mg).

The partition wall BM may overlap a non-light emitting area NPXA when viewed in a plan view. The partition wall BM may prevent a light leakage phenomenon. For example, the partition wall BM may include an organic light blocking material, black pigment or black dye, or the like.

The phase difference layer PD may be disposed on the display module DM. The phase difference layer PD may be disposed between the first polarizing layer PL1 and the display module DM. The phase difference layer PD may be an optical layer which delays a phase of light being provided and changes a phase of an optical vibration direction. The phase difference layer PD may be a λ/4 phase difference layer PD.

The phase difference layer PD may be a liquid crystal coating layer. For example, the phase difference layer PD may include a reactive liquid crystal monomer such as calamitic mesogen exhibiting a nematic liquid crystalline phase or a light reactive polymer having refractive index anisotropy. The phase difference layer PD may be formed by applying and aligning liquid crystals and then polymerizing the liquid crystals.

The phase difference layer PD is disposed on the display module DM and may reduce reflection of external light, which is light incident into the display module DM from the outside of the display device DA, and thus the phase difference layer PD constitutes an optional layer. The external light may be reflected from the first electrode EL1 or the second electrode EL2 including metal, and as the external light is reflected, the first electrode EL1 or the second electrode EL2 may be viewed from the outside. However, the phase difference layer PD may change the phase of the optical vibration direction and thus reduce reflectance of external light in the display device DA. The detailed description thereof will be given with reference to FIGS. 8A and 8B. Here, the phase difference layer PD may be omitted.

The display device DA may include at least one transparent substrate TS. The transparent substrate TS may space components, which are disposed above and below the transparent substrate TS, apart therefrom or may protect each of the components.

The transparent substrate TS may be optically transparent and allow the light, which is output over the display module DM, to pass therethrough. Transparent substrate TS may be, for example, a transparent insulating substrate, a plastic substrate, or a quartz substrate. However, an example of the transparent substrate TS is not limited to the examples described above.

The first polarizing layer PL1, the second polarizing layer PL2, and the liquid crystal layer LQ may be disposed on the display module DM. The liquid crystal layer LQ may be disposed between the first polarizing layer PL1 and the second polarizing layer PL2 which face each other in the direction of the third directional axis DR3. The first polarizing layer PL1 and the second polarizing layer PL2 may be spaced apart from the liquid crystal layer LQ with the transparent substrate TS therebetween or may be in direct contact with the liquid crystal layer LQ.

The first polarizing layer PL1 and the second polarizing layer PL2 may be an optical layer that allows light, which vibrates in a direction substantially parallel to a polarization axis having one direction, to pass therethrough. The polarization direction of the first polarizing layer PL1 and the polarization direction of the second polarizing layer PL2 may be perpendicular to each other.

Each of the first polarizing layer PL1 and the second polarizing layer PL2 may be a polarizing layer that includes an elongated polymer film oriented in one direction. For example, the elongated polymer film may be a polyvinyl alcohol-based film, but the polymer film is not limited to the example described above. The polarizing layer may be manufactured by adsorbing light-absorbing elements onto an elongated film member. The light-absorbing elements may be dichroic dye or iodine. The polarizing layer absorbs light which vibrates in the elongated direction but allows the light, which vibrates in a direction perpendicular to the elongated direction, to pass therethrough, and thus, polarized light having the vibration direction in one direction may be obtained.

The first polarizing layer PL1 and the second polarizing layer PL2 may be an in-cell polarizing layer. The in-cell polarizing layer may include metal. For example, the in-cell polarizing layer may include at least one of aluminum (Al), sliver (AG), or molybdenum-titanium oxide (MTO).

The in-cell polarizing layer may include a wire grid pattern. The wire grid pattern may be a pattern in which wires extending in one direction are spaced apart from each other in a direction perpendicular to the one direction. A spaced gap between the wire grid patterns may be about 30 nm. However, the spaced gap between the wire grid patterns is not limited to the value mentioned above.

The thickness of the in-cell polarizing layer may be several μm or less, for example, about 10 μm or less. If the in-cell polarizing layer is used, the transparent substrate TS between the liquid crystal layer LQ and the polarizing layer may be omitted, and thus, the thickness of display device DA may be reduced.

However, the first polarizing layer PL1 and the second polarizing layer PL2 may be made of various materials as long as they are capable of polarizing light, and are not limited to one example.

A plurality of openings OP may be defined in the first polarizing layer PL1 or the second polarizing layer PL2. The plurality of openings OP may overlap the plurality of light emitting areas PXA-1, PXA-2, and PXA-3 in the direction of the third directional axis DR3. A polarizing layer in which the plurality of openings OP are not defined may cover the plurality of light emitting areas PXA-1, PXA-2, and PXA-3 and the non-light emitting area NPXA.

The plurality of openings OP may correspond to a respective one of the plurality of light emitting areas PXA-1, PXA-2, and PXA-3. For example, one opening may correspond to one light emitting area. However, the embodiments of the invention are not limited thereto, and for some of the plurality of openings OP, one opening may overlap a plurality of light emitting areas. For example, two or more light emitting areas may overlap one opening. Thus, according to shapes of the light emitting areas overlapping the inside of the opening when viewed in a plan view, the opening and a portion of the non-light emitting area NPXA may overlap each other.

The shape of each of the plurality of openings OP may correspond to the shape of the overlapping light emitting area. For example, for at least some of the plurality of openings OP, one opening may correspond to one light emitting area, and in a case where the corresponding light emitting area has a hexagonal shape, the opening may also have a hexagonal shape.

The liquid crystal layer LQ may be disposed between the first polarizing layer PL1 and the second polarizing layer PL2. The liquid crystal layer LQ may include a plurality of liquid crystal molecules LM-W and LM-B. For example, the liquid crystal layer LQ may be provided by arranging liquid crystal molecules LM-W and LM-B having dielectric anisotropy. The liquid crystal molecules LM-W and LM-B are not particularly limited as long as they are liquid crystal molecules used generally. For example, the liquid crystal molecules LM-W and LM-B may include an alkenyl-based liquid crystal compound, an alkoxy-based liquid crystal compound, and the like. The liquid crystal molecules LM-W and LM-B may have negative dielectric anisotropy and positive dielectric anisotropy and are not limited to one example.

The liquid crystal layer LQ may have various types according to arrangements of the liquid crystal molecules LM-W and LM-B. For example, the liquid crystal layer LQ may be a vertical alignment liquid crystal layer or a twisted nematic liquid crystal layer. However, the liquid crystal layer LQ of the embodiments of the invention are not limited to the example described above and may be a liquid crystal layer such as an in-plane switching (IPS) liquid crystal layer or an electrically controlled birefringence (ECB) liquid crystal layer that are generally usable.

Here, an electrode layer for electrically controlling the liquid crystal molecules LM-W and LM-B may be disposed in the liquid crystal layer LQ. According to an electrical signal applied to the electrode layer, the arrangements of the liquid crystal molecules LM-W and LM-B may change.

Figure 3A:
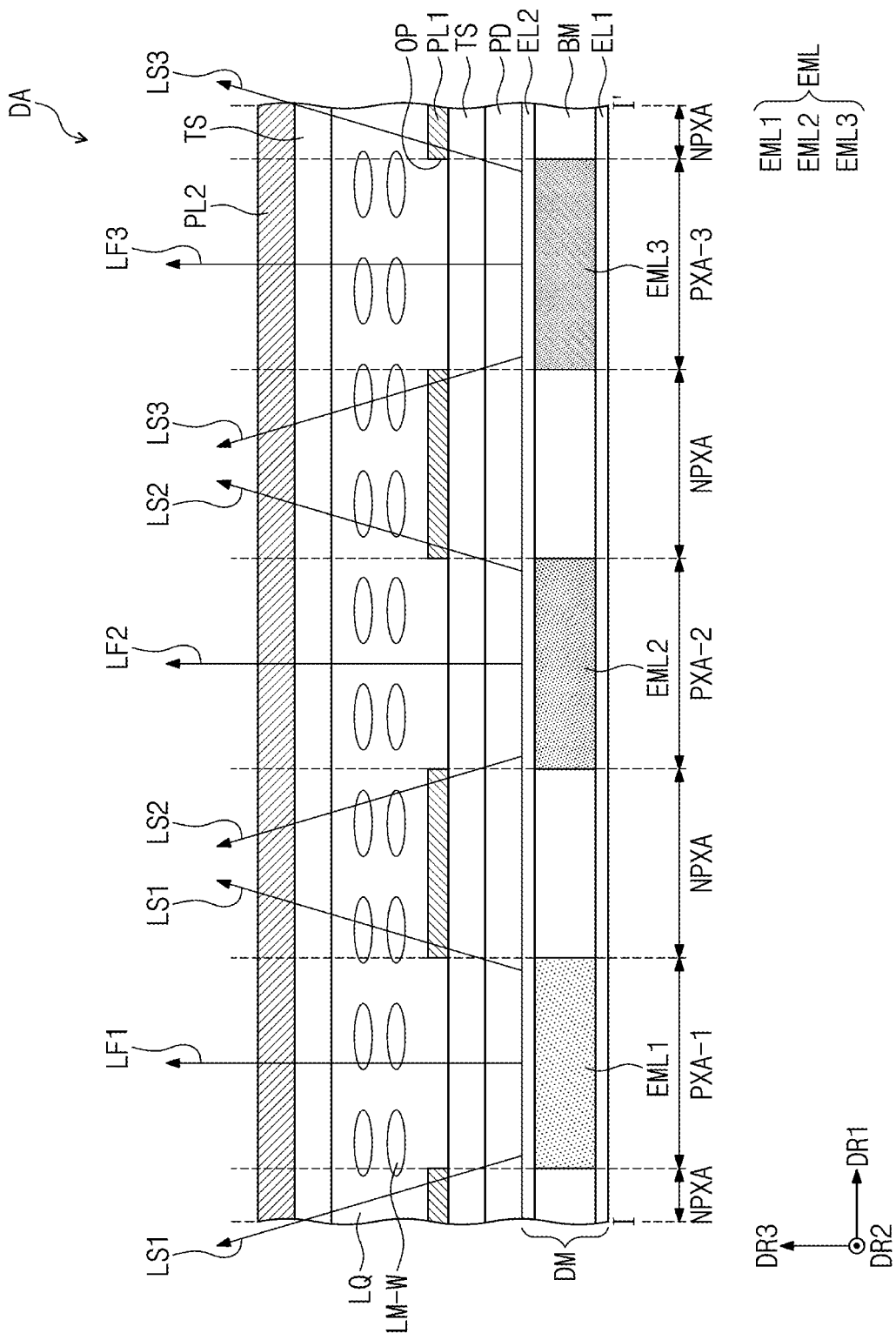
Figure 3B:
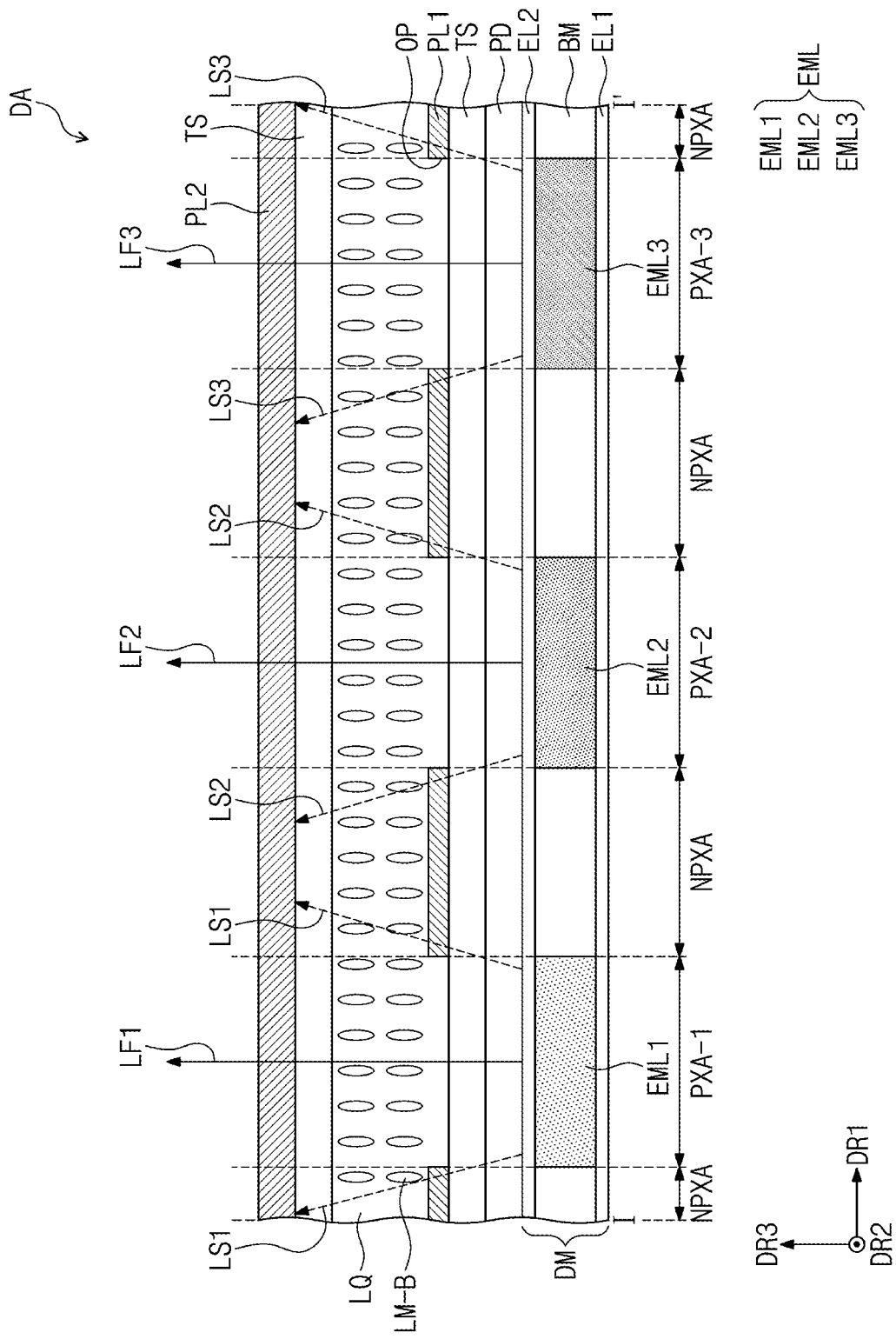

FIGS. 3A and 3B illustrate cross-sectional views of a display device DA according to a public mode and a private mode, respectively. FIG. 3A illustrates the public mode, and the FIG. 3B illustrates the private mode. For convenience of description, paths of light in each of the public mode and the private mode are illustrated together.

A display device DA illustrated in FIGS. 3A and 3B includes a display module DM, a phase difference layer PD, a first polarizing layer PL1, a liquid crystal layer LQ, a second polarizing layer PL2, and a plurality of transparent substrates TS.

Referring to FIGS. 3A and 3B, the first polarizing layer PL1 may be disposed above the display module DM and be in contact with a lower portion of the liquid crystal layer LQ. A plurality of openings OP may be defined in the first polarizing layer PL1. When viewed in a plan view, the plurality of openings OP may overlap a first light emitting area PXA-1, a second light emitting area PXA-2, and a third light emitting area PXA-3 respectively.

The second polarizing layer PL2 may be disposed spaced apart from a top surface of the liquid crystal layer LQ with one transparent substrate TS therebetween. When viewed in a plan view, the second polarizing layer PL2 may overlap the light emitting areas PXA-1, PXA-2, and PXA-3 and a non-light emitting area NPXA and may cover the top surface of the liquid crystal layer LQ.

Referring to FIG. 3A, the liquid crystal layer LQ may be a vertical alignment liquid crystal layer. In the public mode, liquid crystal molecules LM-W included in the liquid crystal layer LQ may be arranged horizontal to a top surface of the display module DM along a direction of a first directional axis DR1 substantially parallel to the top surface of the display module.

Front light beams emitted from the first light emitting layer EML1, the second light emitting layer EML2, and the third light emitting layer EML3 in a direction of a third directional axis DR3 may be defined as a first front light beam LF1, a second front light beam LF2, and a third front light beam LF3, respectively. Lateral light beams emitted laterally from the first light emitting layer EML1, the second light emitting layer EML2, and the third light emitting layer EML3 may be defined as a first lateral light beam LS1, a second lateral light beam LS2, and a third lateral light beam LS3, respectively.

The front light beams LF1, LF2, and LF3 may pass through the second polarizing layer PL2 via the plurality of openings OP and the liquid crystal layer LQ. The front light beams LF1, LF2, and LF3 pass through one polarizing layer and thus may be emitted as polarized light over the display device DA. As the front light beams LF1, LF2, and LF3 pass through the one polarizing layer, the optical efficiency may be relatively enhanced compared to when passing through two or more polarizing layers.

The lateral light beams LS1, LS2, and LS3 may pass through the first polarizing layer PL1, the liquid crystal layer LQ, and the second polarizing layer PL2. The optical vibration directions of the lateral light beams LS1, LS2, and LS3, which are polarized after passing through the first polarizing layer PL1, may be changed by the liquid crystal molecules LM-W horizontally arranged. The lateral light beams LS1, LS2, and LS3, which have passed through the liquid crystal layer LQ, pass through the second polarizing layer PL2 and then may be output, as polarized light, over the display device DA.

Thus, in the public mode, a user may view all of the front light beams LF1, LF2, and LF3 and the lateral light beams LS1, LS2, and LS3 that are emitted from the display module DM. Consequently, the display device DA in the public mode may have a wide optical viewing angle, and as illustrated in the left drawing of FIG. 1, the user may view an image even from the side of the display surface IS-O (refer to FIG. 1).

Referring to FIG. 3B, in the private mode, liquid crystal molecules LM-B included in the liquid crystal layer LQ may be arranged to be in a substantially vertical orientation relative to the top surface of the display module DM. That is, in the private mode, the orientation of the liquid crystal molecules LM-B may be arranged substantially parallel to the direction of the third directional axis DR3 vertical to the top surface of the display module DM.

For example, when the display device DA goes from the public mode to the private mode, an electrical field is applied to the liquid crystal layer LQ, causing the orientation of liquid crystal molecules in the liquid crystal layer LQ to go from a horizontal disposition to a vertical disposition with respect to a top surface of the display module DM. When the electrical field is no longer applied to the liquid crystal layer LQ, such as due to an external input to the display device DA to cause the display device DA to enter the public mode, the liquid crystal molecules of that layer go back to a horizontal disposition with respect to a top surface of the display module DM.

Similar to the public mode, front light beams LF1, LF2, and LF3 in the private mode may pass through the second polarizing layer PL2 via the plurality of openings OP and the liquid crystal layer LQ. The front light beams LF1, LF2, and LF3 may be emitted as polarized light over the display device DA.

In the private mode, lateral light beams LS1, LS2, and LS3 may pass through the first polarizing layer PL1 and the liquid crystal layer LQ, but may not pass through the second polarizing layer PL2. The lateral light beams LS1, LS2, and LS3 pass through the first polarizing layer PL1 and then may pass through the liquid crystal layer LQ in a polarized state. Even after passing through the liquid crystal layer LQ, the polarization directions of the polarized lateral light beams LS1, LS2, and LS3 may be maintained due to the liquid crystal molecules LM-B arranged vertical to a light movement direction. The lateral light beams LS1, LS2, and LS3 polarized by the first polarizing layer PL1 may not be output over the display device DA due to the second polarizing layer PL2 having the polarization direction perpendicular to the polarization direction of the first polarizing layer PL1.

Thus, in the private mode, the user may view the front light beams LF1, LF2, and LF3 which are output from the display module DM, but may not view the lateral light beams LS1, LS2, and LS3. Consequently, the display device DA in the private mode may have a narrow optical viewing angle, and as illustrated in the right drawing of FIG. 1, the user may not view an image from the side of the display surface IS-P (refer to FIG. 1).

Figure 4:
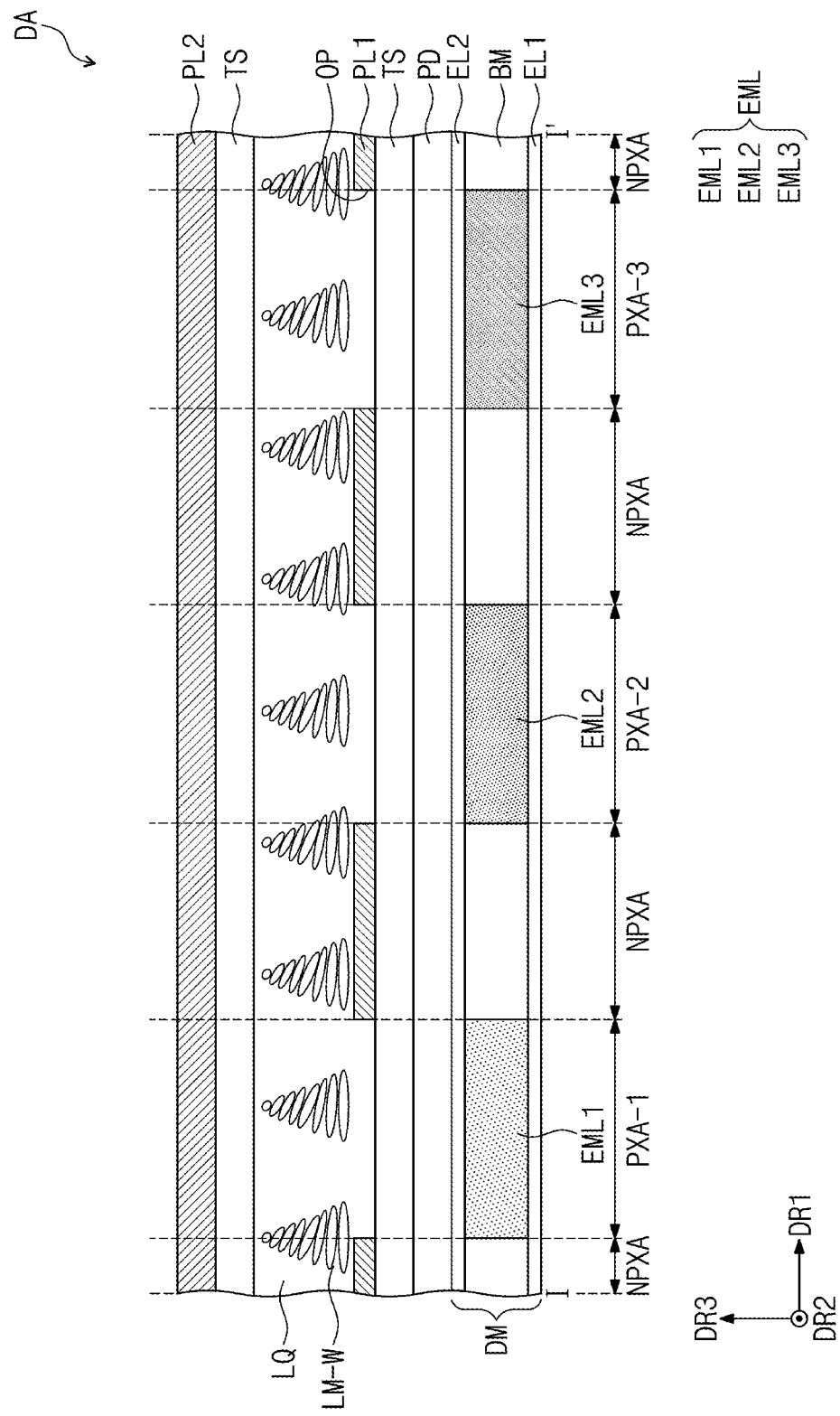

FIG. 4 illustrates a cross-sectional view of a display device DA including a liquid crystal layer LQ of a different type from the liquid crystal layer LQ illustrated in FIG. 3A.

Referring to FIG. 4, the liquid crystal layer LQ may be a twisted nematic liquid crystal layer. In a public mode, liquid crystal molecules LM-W included in the liquid crystal layer LQ are arranged in a direction substantially parallel to a top surface of the display module DM, and the liquid crystal molecules LM-W included therein may be twisted along a direction of a third directional axis DR3.

Thus, the optical vibration directions of the lateral light beams LS1, LS2, and LS3 (refer to FIG. 3A), which are polarized in the public mode, may be changed by the twisted liquid crystal molecules LM-W while passing through the liquid crystal layer LQ. Therefore, even in a case where the display device DA includes the twisted nematic liquid crystal layer, all of the front light beams LF1, LF2, and LF3 (refer to FIG. 3A) and the lateral light beams LS1, LS2, and LS3 (refer to FIG. 3A) may be output over the display device DA in the public mode, and thus, the display device DA may have a wide optical viewing angle.

Even in a case of the twisted nematic liquid crystal layer, the liquid crystal layer LQ in a private mode may include liquid crystal molecules LM-B that are arranged vertical to the top surface of the display module DM as illustrated in FIG. 3B. Thus, only the front light beams LF1, LF2, and LF3 (refer to FIG. 3A) and not lateral light beams LS1, LS2, and LS3 (refer to FIG. 3A) may be output over the display device DA in the private mode, and thus, the display device DA may have a narrow optical viewing angle.

Figure 5:
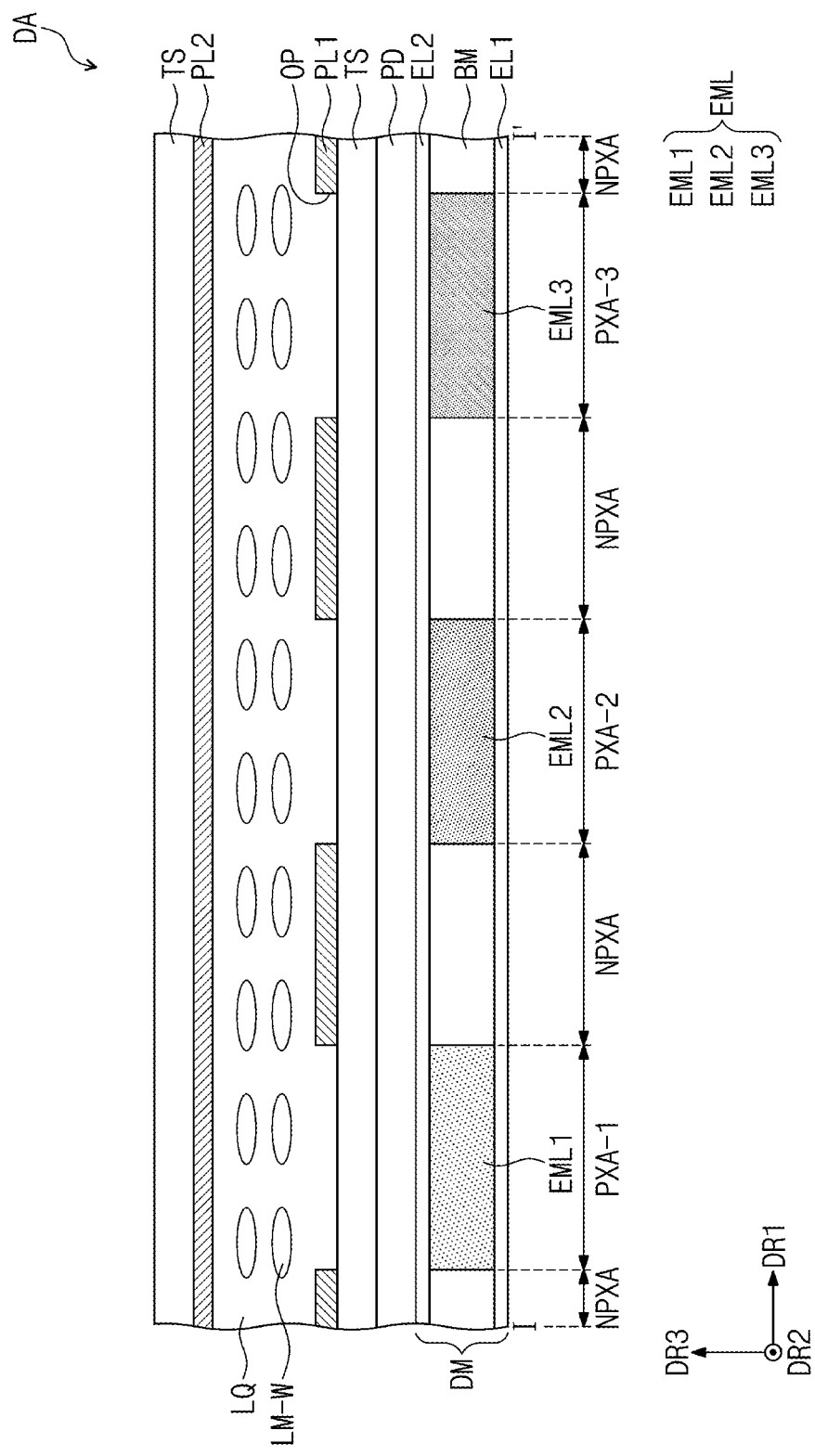
Figure 6:
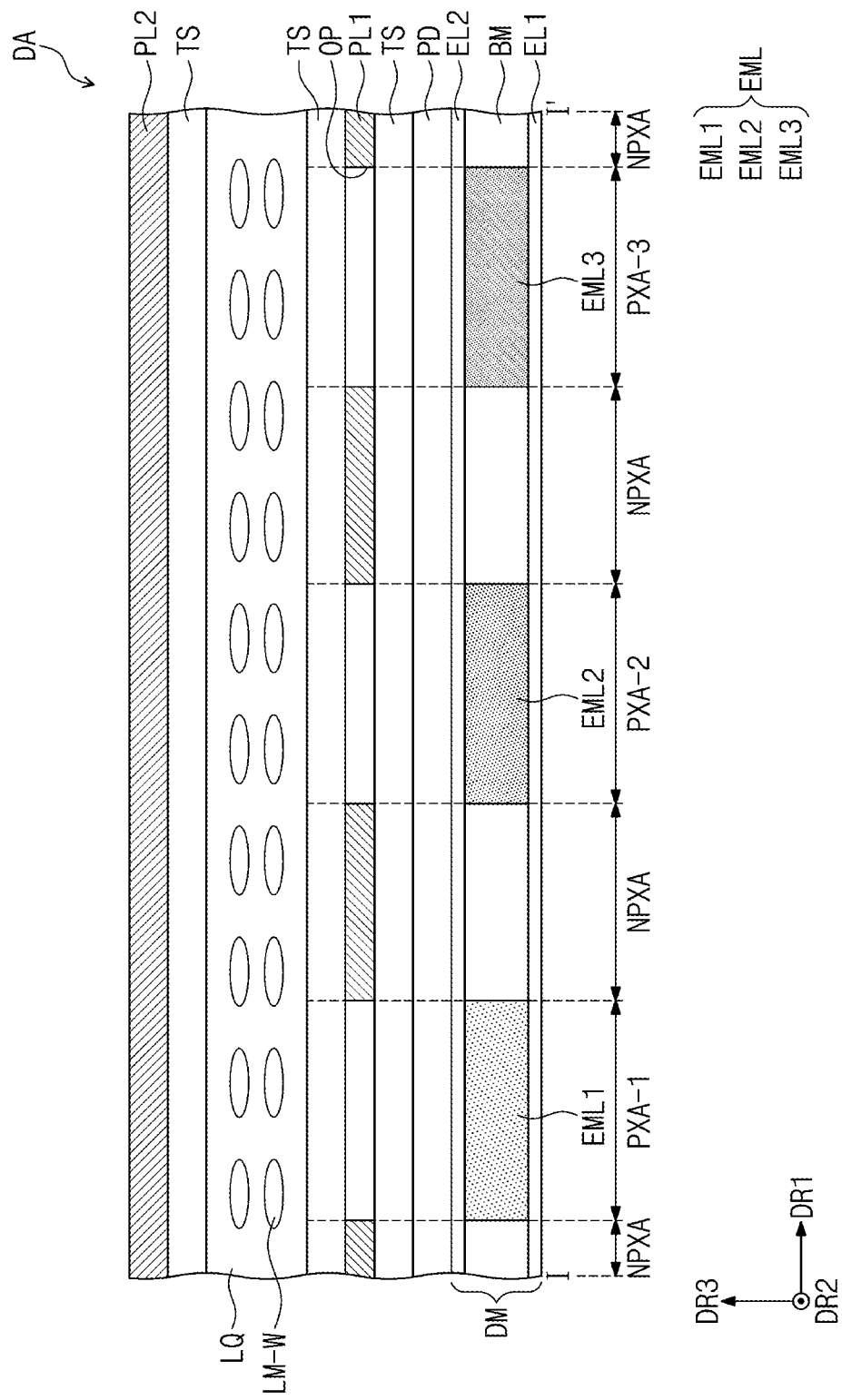
Figure 7:
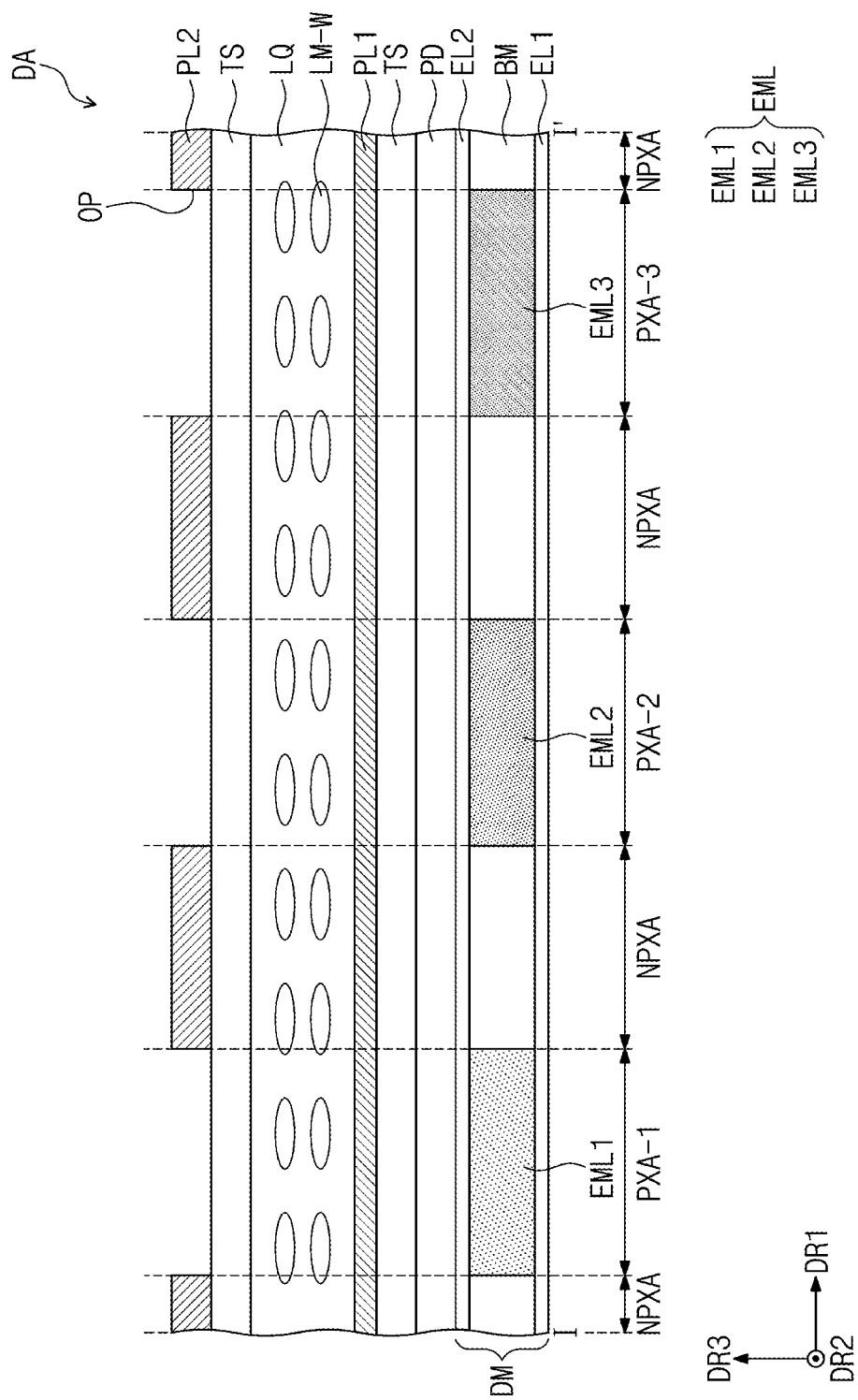

FIGS. 5 to 7 illustrate cross-sectional views of a display device DA having different arrangements or shapes of a first polarizing layer PL1 and a second polarizing layer PL2. The descriptions given with reference to FIGS. 2 to 4 may be applied to common components in the substantially the same way, and differences from the display device DA of the embodiment illustrated in the FIG. 3A will be mainly described.

Referring to FIG. 5, each of a first polarizing layer PL1 and a second polarizing layer PL2 may be an in-cell polarizing layer that is in contact with a liquid crystal layer LQ. The first polarizing layer PL1 may be in contact with a lower portion of the liquid crystal layer LQ, and the second polarizing layer PL2 may be in contact with an upper portion of the liquid crystal layer LQ.

In a case where each of the first polarizing layer PL1 and the second polarizing layer PL2 is the in-cell polarizing layer, thicknesses of the first polarizing layer PL1 and the second polarizing layer PL2 may be reduced. Also, the first polarizing layer PL1 and the second polarizing layer PL2 may not be spaced apart from the liquid crystal layer LQ with a transparent substrate TS therebetween. Thus, when compared to the display device DA of the embodiment illustrated in FIG. 3A, the thickness of a display device DA including the first polarizing layer PL1 and the second polarizing layer PL2 illustrated in FIG. 5 may also be reduced.

The first polarizing layer PL1 or the second polarizing layer PL2 may be an in-cell polarizing layer in which a plurality of openings OP are defined. FIG. 5 illustrates that the plurality of openings OP are defined in the first polarizing layer PL1.

The transparent substrate TS may be disposed on the second polarizing layer PL2 and may protect the second polarizing layer PL2 and the liquid crystal layer LQ that are disposed below the transparent substrate TS.

Referring to FIG. 6, each of the first polarizing layer PL1 and the second polarizing layer PL2 may be a polarizing layer that is spaced apart from a liquid crystal layer LQ with a transparent substrate TS therebetween. The transparent substrates TS may be disposed above and below the liquid crystal layer LQ to protect the liquid crystal layer LQ.

The first polarizing layer PL1 may be disposed between a transparent substrate TS disposed on a phase difference layer PD and the transparent substrate TS disposed below the liquid crystal layer LQ. When compared to the display device DA of the embodiment illustrated in FIG. 3A, the display device DA illustrated in FIG. 6 further includes the transparent substrate TS disposed between the first polarizing layer PL1 and the liquid crystal layer LQ, and thus, the thickness thereof may be relatively further increased.

Referring to FIG. 7, a plurality of openings OP may be defined in a second polarizing layer PL2. A first polarizing layer PL1 may be a polarizing layer which overlaps light emitting areas PXA-1, PXA-2, and PXA-3 and a non-light emitting area NPXA when viewed in a plan view and covers the light emitting areas PXA-1, PXA-2, and PXA-3 and the non-light emitting area NPXA. The second polarizing layer PL2 may be a polarizing layer in which the plurality of openings OP overlapping the respective one of the light emitting areas PXA-1, PXA-2, and PXA-3 are defined.

A display device DA, which includes the second polarizing layer PL2 in which the plurality of openings OP are defined, may be switched between a public mode and a private mode while increasing efficiency of front light beams. In the display device DA, the degree of the external light reflection, the value of the optical efficiency, luminance of light, or the like may vary depending on whether the plurality of openings OP are defined in the first polarizing layer PL1 or the second polarizing layer PL2.

By the polarizing layer that is included in the display device DA and has the plurality of openings OP defined therein, front light beams output from the display module DM may pass through only one polarizing layer. Accordingly, the display device DA may be switched between the public mode and the private mode, and the optical efficiency in each of the modes is improved.

Figure 8A:
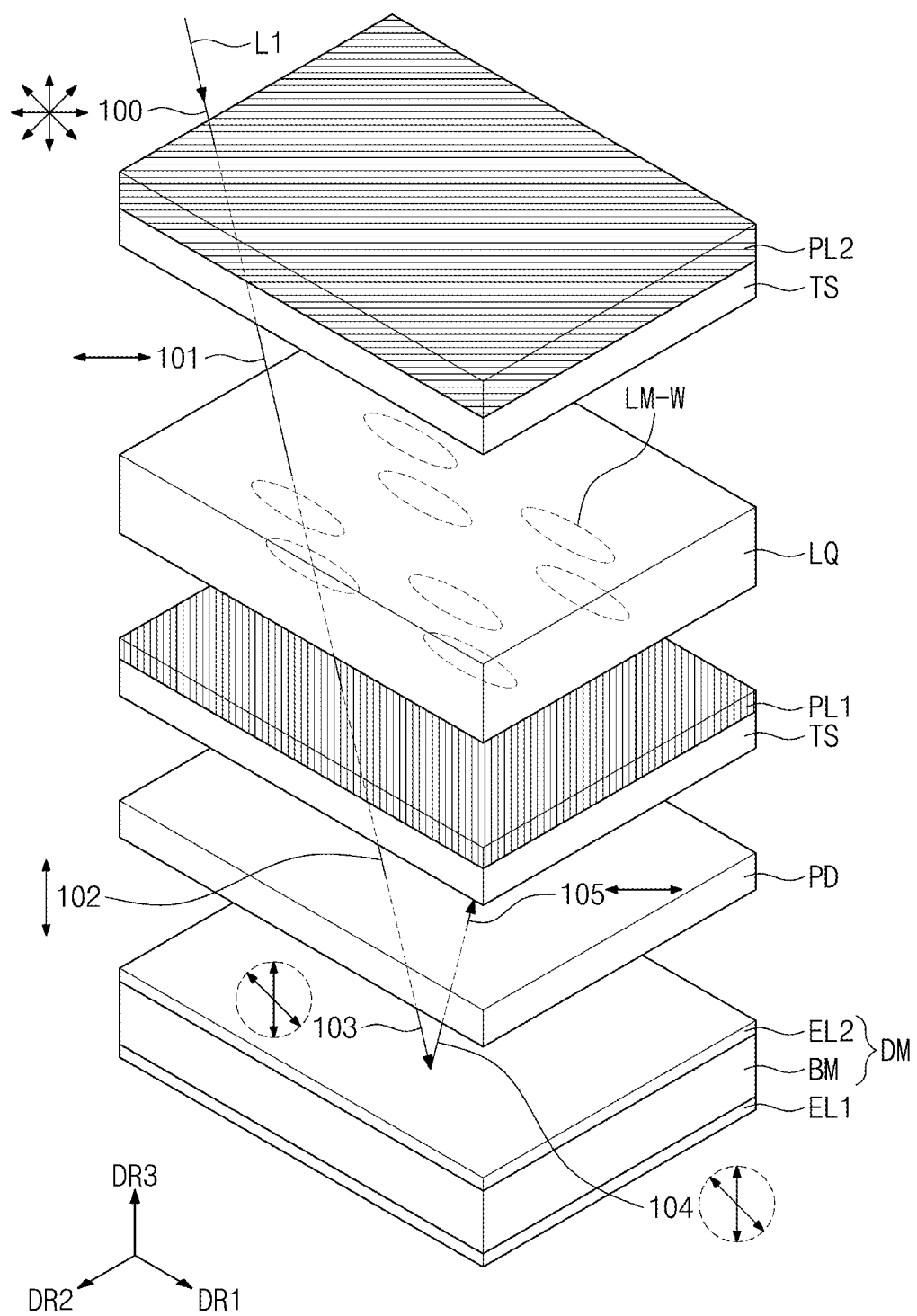
FIGS. 8A and 8B are perspective views illustrating a portion of an embodiment of a display device constructed according to the principles of the invention that overlaps a non-light emitting area.
Figure 8B:
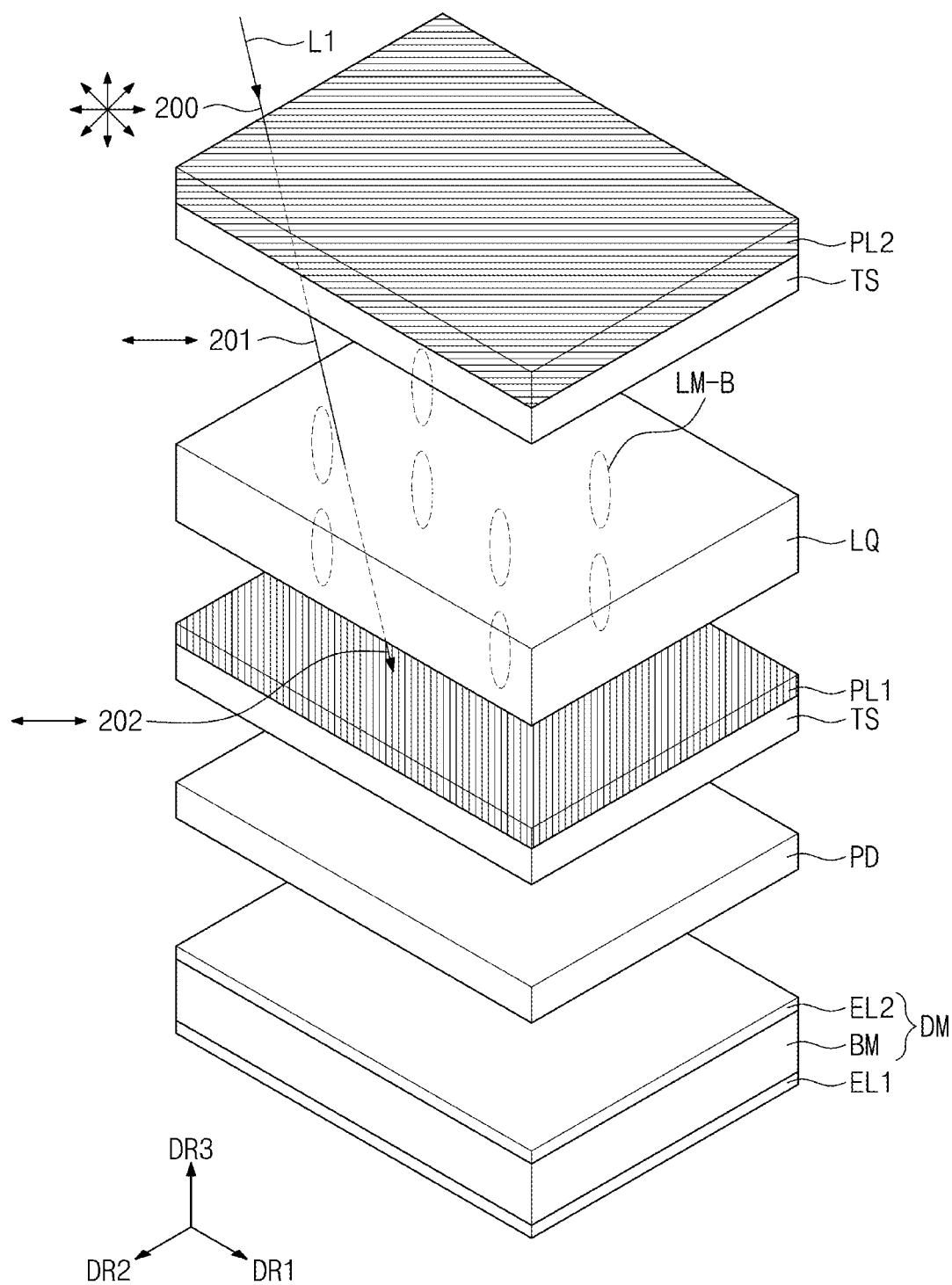

FIGS. 8A and 8B are perspective views illustrating a portion of a display device DA that overlaps a non-light emitting area NPXA. FIG. 8A is a perspective view of the display device DA in a public mode, and FIG. 8B is a perspective view of the display device DA in a private mode. For convenience of description, FIGS. 8A and 8B schematically illustrate optical vibration directions of external light L1. The descriptions given above may be applied to each of components in FIGS. 8A and 8B in the substantially the same way.

Referring to FIGS. 8A and 8B, the polarization direction of a first polarizing layer PL1 and the polarization direction of a second polarizing layer PL2 may be perpendicular to each other. The phase difference layer PD may be a λ/4 phase difference layer. In a public mode, a liquid crystal layer LQ may include liquid crystal molecules LM-W that are horizontally arranged in a direction substantially parallel to a direction of a first directional axis DR1. In a private mode, a liquid crystal layer LQ may include liquid crystal molecules LM-B that are vertically arranged in a direction substantially parallel to a direction of a third directional axis DR3.

FIG. 8A illustrates external light L1 which is incident toward a display device DA in the public mode. The external light L1 before passing through the second polarizing layer PL2 may be light 100 that vibrates in all directions. The external light L1, that has passed through the second polarizing layer PL2, may become first polarized light 101 that vibrates in the polarization direction of the second polarizing layer PL2.

While the first polarized light 101 passes through the liquid crystal layer LQ, a vibration direction thereof may be rotated by the liquid crystal molecules LM-W. Thus, the external light L1, which has passed through the liquid crystal layer LQ, may pass through the first polarizing layer PL1. The external light L1, that has passed through the first polarizing layer PL1, may become second polarized light 102 that vibrates in the polarization direction of the first polarizing layer PL1.

The second polarized light 102 may pass through the λ/4 phase difference layer PD, and the light passing through the λ/4 phase difference layer PD may be converted into first circularly polarized light 103. The first circularly polarized light 103 may be circularly polarized light having an axis that is displaced by about 45° from an axis of the polarization direction of the first polarizing layer PL1. The first circularly polarized light 103 may be reflected by electrodes EL1 and EL2 included in a display module DM. The reflected light 104, which is a reflected light of the first circularly polarized light 103, may also be circularly polarized light.

The reflected light 104 passes through the λ/4 phase difference layer PD again, and thus, a direction axis of the light may be changed. The reflected light 104, which has passed through the λ/4 phase difference layer PD, becomes third polarized light 105 having a polarization direction vertical to the polarization direction of the second polarized light 102. That is, the third polarized light 105 vibrates perpendicular to the polarization direction of the first polarizing layer PL1 and thus may not pass through the first polarizing layer PL1.

Thus, in the display device DA of the FIG. 8 embodiment, the reflection of external light may be reduced by the phase difference layer PD that is disposed below the plurality of polarizing layers PL1 and PL2 having polarization directions perpendicular to each other. As the external light passes through the phase difference layer twice, the vibration direction is changed to be perpendicular to the polarization direction of the polarizing layer adjacent to the phase difference layer, and thus the external light may not pass through the polarizing layer.

FIG. 8B illustrates external light L1 which is incident toward the display device DA in the private mode. The external light L1 before passing through the second polarizing layer PL2 may be light 200 that vibrates in all directions. The external light L1, which has passed through the second polarizing layer PL2, may become first polarized light 201 that vibrates in the polarization direction of the second polarizing layer PL2.

While the first polarized light 201 passes through the liquid crystal layer LQ, the vibration direction thereof may be maintained by the liquid crystal molecules LM-B which are arranged vertically. Thus, light 202, which has passed through the liquid crystal layer LQ, may be polarized light having the substantially the same vibration direction as the first polarized light 201. That is, the light 202, which has passed through the liquid crystal layer LQ, may be light that vibrates in the polarization direction of the second polarizing layer PL2.

The light 202, which has passed through the liquid crystal layer LQ, may not pass through the first polarizing layer PL1 that has the polarization direction perpendicular to the polarization direction of the second polarizing layer PL2. This is because the polarization direction of the first polarizing layer PL1 is perpendicular to the vibration direction of the light 202 which has passed through the liquid crystal layer LQ. Thus, the external light L1 may not be reflected by the first polarizing layer PL1 and the second polarizing layer PL2 in the private mode, and accordingly, the reflectance of the external light in the display device DA may be reduced.

Figure 9A:
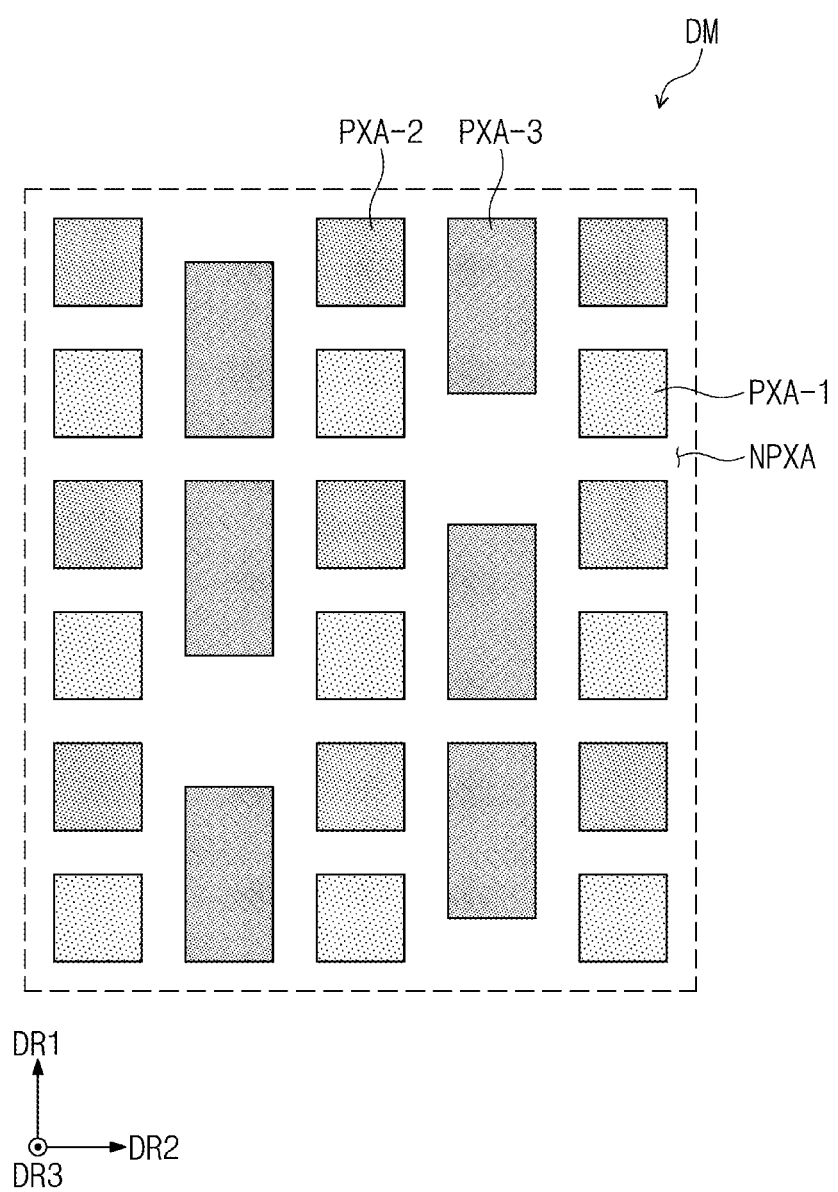
FIG. 9A is a partial plan view of an embodiment of a display module constructed according to the principles of the invention.
Figure 9B:
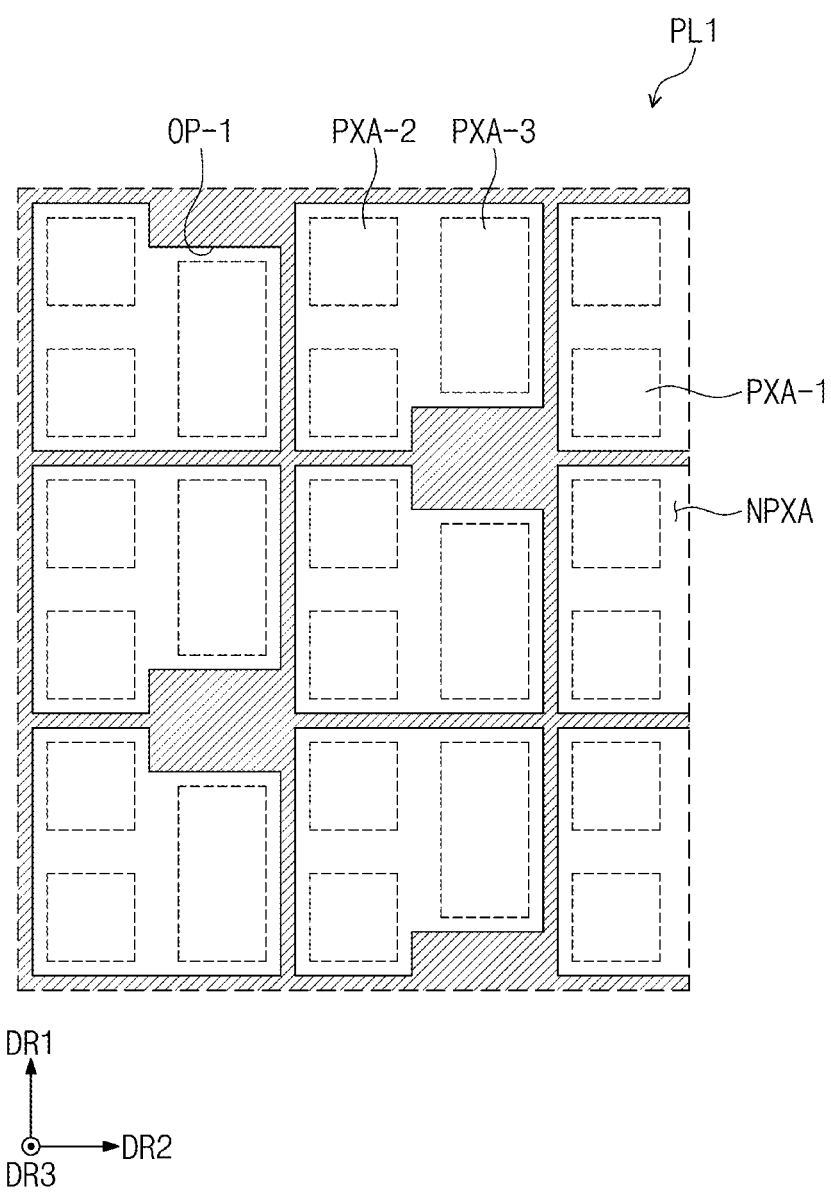
FIGS. 9B to 9D illustrate partial plan views of embodiments of a first polarizing layer having a plurality of openings defined therein with respect to the display module DM of FIG. 9A.
Figure 9C:
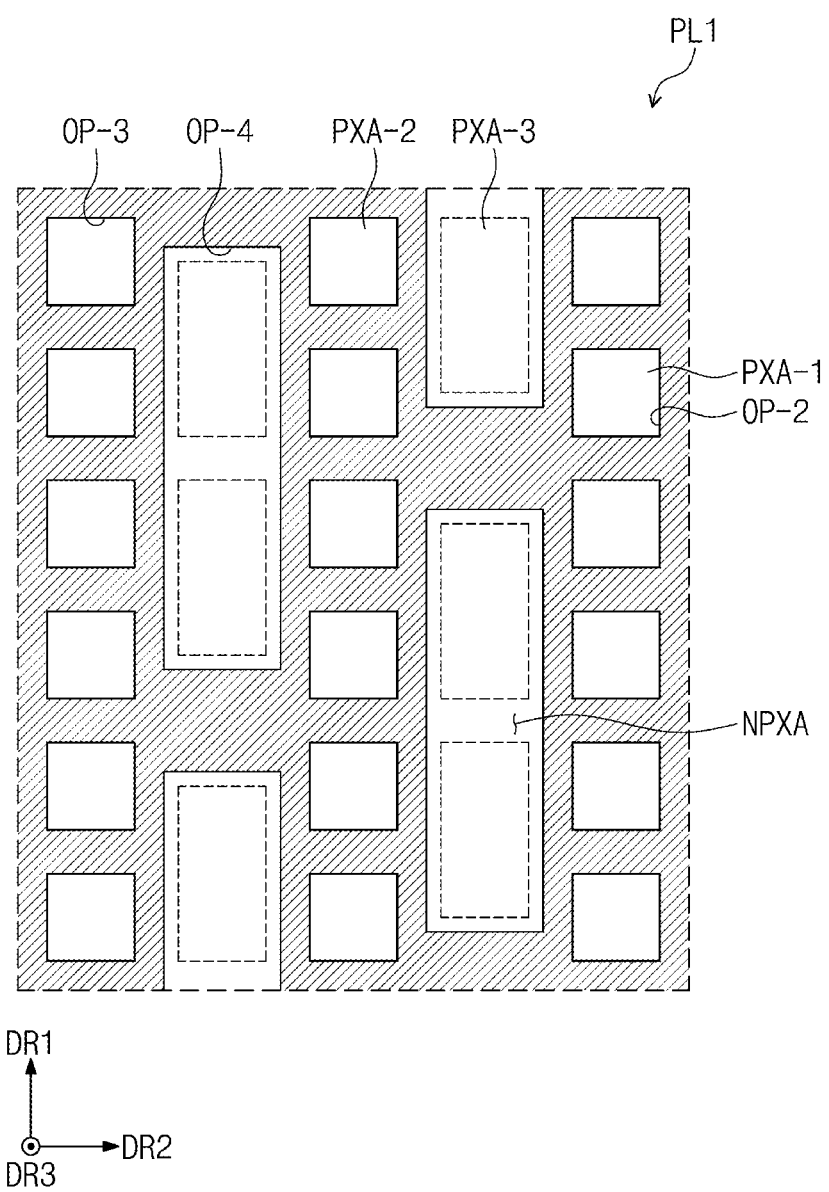
Figure 9D:
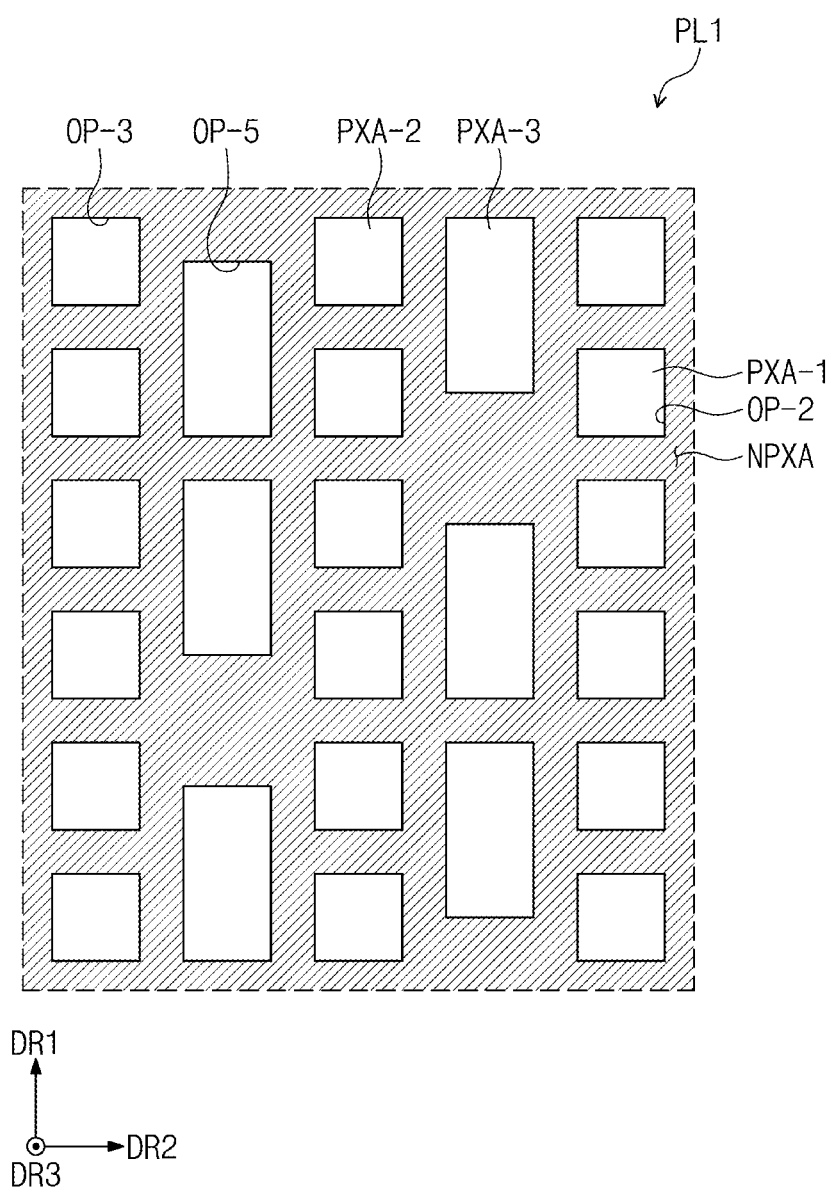

FIG. 9A illustrates a partial plan view of a display module DM. FIGS. 9B to 9D illustrate partial plan views of a first polarizing layer PL1 having a plurality of openings OP defined therein with respect to the display module DM illustrated in FIG. 9A.

As one embodiment, FIG. 9A illustrates a plurality of light emitting areas PXA-1, PXA-2, and PXA-3 having a generally quadrilateral shape when viewed in a plan view and a non-light emitting area NPXA surrounding the plurality of light emitting areas PXA-1, PXA-2, and PXA-3. Referring to FIG. 9A, each of a first light emitting area PXA-1 for outputting first color light, a second light emitting area PXA-2 for outputting second color light, and a third light emitting area PXA-3 for outputting third color light may be provided in plurality, and the display module DM may include the plurality of first to third light emitting areas PXA-1, PXA-2, and PXA-3 that are arranged regularly.

When viewed in a plan view, the surface areas of the plurality of light emitting areas PXA-1, PXA-2, and PXA-3 may be of differing sizes. Some of the light emitting areas may have the substantially the same surface area, and the others may have different surface areas. Referring to FIG. 9A, the first light emitting area PXA-1 and the second light emitting area PXA-2 may have the substantially the same surface area when viewed in a plan view but the surface area of the third light emitting area PXA-3 may be different from that of each of the first and second light emitting areas PXA-1 and PXA-2.

However, the shapes and arrangements of the plurality of light emitting areas PXA-1, PXA-2, and PXA-3 and the non-light emitting area NPXA included in the display module DM are not limited to the example illustrated in FIG. 9A.

For a plurality of openings as illustrated in FIG. 9B, one opening OP-1 may overlap a plurality of light emitting areas. One opening of the plurality of openings may be defined as a first opening OP-1, and the first opening OP-1 may overlap the first to third light emitting areas PXA-1, PXA-2, and PXA-3.

The first to third light emitting areas PXA-1, PXA-2, and PXA-3 overlapping the first opening OP-1 may be light emitting areas which output color light different from each other. However, the embodiments of the invention are not limited thereto, and the first to third light emitting areas PXA-1, PXA-2, and PXA-3 overlapping the first opening OP-1 may be light emitting areas, some of which output the substantially the same color light or all of which output the substantially the same color light.

The openings may have various shapes corresponding to the overlapping light emitting areas. The shape of the openings may be defined so that the non-light emitting area NPXA overlapping the openings is minimized when viewed in a plan view. For example, as illustrated in FIG. 9B, the first opening OP-1 may have a generally polygonal shape.

Referring to FIG. 9C, for some of a plurality of openings, one opening may overlap a plurality of light emitting areas, and for the others of the openings, one opening may overlap a respective one light emitting area.

The opening overlapping the first light emitting area PXA-1 may be defined as a second opening OP-2, and the opening overlapping the second light emitting area PXA-2 may be defined as a third opening OP-3. The opening overlapping a plurality of third light emitting areas PXA-3 may be defined as a fourth opening OP-4.

The plurality of openings OP-2, OP-3, and OP-4 defined in a first polarizing layer PL1 may have the substantially the same surface area when viewed in a plan view, and some of the openings may have the different surface areas. As one example, as illustrated in FIG. 9C, the second and third openings OP-2 and OP-3 may have the substantially the same surface area when viewed in a plan view, and the fourth opening OP-4 may have a surface area different from that of each of the second and third openings OP-2 and OP-3.

The second and third openings OP-2 and OP-3 may correspond to the first and second light emitting areas PXA-1 and PXA-2, respectively, when viewed in a plan view. The fourth opening OP-4 may overlap the plurality of third light emitting areas PXA-3. Thus, the plurality of light emitting areas overlapping one opening may be areas that output the substantially the same color light, and this color light may be different from that of a light emitting area overlapping another opening. Some of the openings may overlap a portion of the non-light emitting area NPXA, and the others may not overlap the non-light emitting area NPXA.

Referring to FIG. 9D, each of a plurality of openings may correspond to a respective one of the plurality of light emitting areas. For each of the plurality of openings, one opening may overlap one light emitting area. The opening overlapping the first light emitting area PXA-1 may be defined as a second opening OP-2, the opening overlapping the second light emitting area PXA-2 may be defined as a third opening OP-3, and the opening overlapping the third light emitting area PXA-3 may be defined as a fifth opening OP-5.

The shape of each of the plurality of openings may correspond to the shape of the respective one of the plurality of light emitting areas. The shapes of the second opening OP-2, the third opening OP-3, and the fifth opening OP-5 may correspond to the shapes of first light emitting area PXA-1, the second light emitting area PXA-2, and the third light emitting area PXA-3, respectively. Thus, the plurality of openings defined in a polarizing layer may not overlap the non-light emitting area NPXA.

The second opening OP-2, the third opening OP-3, and the fifth opening OP-5 may correspond to light emitting areas that output color light different from each other. For example, red light may pass through the second opening OP-2, green light may pass through the third opening OP-3, and blue light may pass through the fifth opening OP-5.

FIGS. 9B to 9D illustrate the plan views of the first polarizing layer PL1 in which the plurality of openings OP are defined, but in the substantially the same way, the above descriptions may also be applied to the second polarizing layer PL2 in which the plurality of openings OP are defined.

The shape of the polarizing layer having the plurality of openings OP defined therein when viewed in a plan view is not limited to the embodiments illustrated FIGS. 9B to 9D. The polarizing layer of may have one of various different shapes as long as the opening overlapping the light emitting area is defined in the polarizing layer, and is not limited to one particular shape.

Display devices constructed according to the principles and embodiments of the invention may include a plurality of polarizing layers having the polarization directions perpendicular to each other and the liquid crystal layer disposed between the plurality of polarizing layers, and thus, the display device is provided which is switchable between the public mode and the private mode. The plurality of openings overlapping the plurality of light emitting areas may be defined in one of the plurality of polarizing layers, and thus, the optical efficiency of the front light beams of the display device may be improved in the public mode and the private mode.

Also, display devices constructed according to the principles and embodiments of the invention may reduce the reflection of external light in the private mode by using the plurality of polarizing layers that have the polarization directions perpendicular to each other, and the display device may further include a phase difference layer below the plurality of polarizing layers to reduce the reflection of external light even in the public mode.

Display devices constructed according to the principles and embodiments of the invention are switchable between private and public modes and have improved optical efficiency.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display module having a plurality of light emitting areas and a non-light emitting area that at least partially surrounds the plurality of light emitting areas and that emit light towards a first direction;
   a phase difference layer disposed on the display module,
   a first polarizer disposed on the phase difference layer;
   a second polarizer disposed on the first polarizer; and
   a liquid crystal layer disposed between the first polarizer and the second polarizer,
   wherein the phase difference layer is disposed closer to the display module than the first polarizer in the first direction, and
   wherein a plurality of openings are defined in the first polarizer or the second polarizer, and the plurality of openings overlap the plurality of light emitting areas.

2. The display device of claim 1, wherein a polarization direction of the first polarizer and a polarization direction of the second polarizer are orthogonal to each other.

3. The display device of claim 1, further comprising at least one transparent substrate disposed on the display module,
   wherein at least one of the first polarizer and the second polarizer comprises a polymer and is spaced apart from the liquid crystal layer with the transparent substrate therebetween.

4. The display device of claim 1, wherein at least one of the first polarizer and the second polarizer comprises metal and is in contact with the liquid crystal layer.

5. The display device of claim 1, wherein the first and second polarizers comprise first and second polarizing layers and the openings are defined in the first polarizing layer, and the second polarizing layer covers the plurality of light emitting areas and the non-light emitting area.

6. The display device of claim 1, wherein the first and second polarizers comprise first and second polarizing layers and the openings are defined in the second polarizing layer, and the first polarizing layer covers the plurality of light emitting areas and the non-light emitting area.

7. The display device of claim 1, wherein the phase difference layer is a λ/4 phase difference layer.

8. The display device of claim 1, wherein each of the openings corresponds to a respective one of the plurality of light emitting areas.

9. The display device of claim 8, wherein each of the plurality of light emitting areas is a light emitting area configured to emit first color light, second color light, or third color light,
and wherein at least one of the openings has a square shape with a respective one of the plurality of light emitting areas having a square shape of a same size as the at least one of the openings, wherein at least another of the openings has a non-square rectangular shape with a respective another of the plurality of light emitting areas having a non-square rectangular shape of a same size as the at least another of the openings, and wherein the plurality of light emitting elements do not extend into the respective openings.

10. The display device of claim 1, wherein, for at least some of the openings, one opening overlaps at least two of the plurality of light emitting areas.

11. The display device of claim 10, wherein the plurality of light emitting areas overlapping the one opening emit the substantially the same color light.

12. The display device of claim 10, wherein the plurality of light emitting areas overlapping the one opening emit light of different colors.

13. The display device of claim 1, wherein the liquid crystal layer is one of a vertical alignment liquid crystal layer and a twisted nematic liquid crystal layer.

14. The display device of claim 1, wherein the display device is switchable in response to an external input to change the orientation of molecules in the liquid crystal layer to switch the display from a private viewing mode in which light passes through only one of the first and second polarizers, and a public viewing mode in which light passes through both of the first and second polarizers.

15. The display device of claim 1, wherein the display module comprises an organic light emitting display panel, a quantum dot display panel, a micro LED display panel, or a liquid crystal display panel.

16. A display device comprising:
a display module having a plurality of light emitting areas and a non-light emitting area that at least partially surrounds the plurality of light emitting areas and that emit light towards a first direction;
a phase difference layer disposed on the display module;
a liquid crystal layer disposed on the phase difference layer;
an in-cell polarizer disposed between the phase difference layer and the liquid crystal layer and in contact with the liquid crystal layer; and
a polarizer disposed on the liquid crystal layer,
wherein the phase difference layer is disposed closer to the display module than the in-cell polarizer in the first direction, and
wherein a plurality of openings are defined in the in-cell polarizer, and each of the openings overlaps a respective one of the plurality of light emitting areas.

17. The display device of claim 16, wherein a polarization direction of the in-cell polarizer and a polarization direction of the polarizer are orthogonal.

18. The display device of claim 16, wherein the in-cell polarizer comprises a wire grid polarizing layer and the polarizer disposed on the liquid crystal layer comprises a polarizing layer.

19. The display device of claim 16, wherein each of the openings has a shape that corresponds to a shape of the respective one of the plurality of light emitting areas.

20. The display device of claim 16, wherein the display device is switchable in response to an external input to change the orientation of molecules in the liquid crystal layer to switch the display from a private viewing mode in which light passes through only one of the in-cell polarizing layer and the polarizer, and a public viewing mode in which light passes through both of the in-cell polarizer and the polarizer.

* * * * *